United States Patent
Lin

(10) Patent No.: US 6,241,837 B1
(45) Date of Patent: Jun. 5, 2001

(54) METHOD OF PRODUCING CERAMIC ARTICLE WITH RELIEF DECORATION

(76) Inventor: Li Ho Lin, No. 691, 6-1 Floor, Chung Shan Rd., Tau Iuan City (TW)

(*) Notice: Subject to any disclaimer, the term of this patent is extended or adjusted under 35 U.S.C. 154(b) by 0 days.

(21) Appl. No.: 09/305,299

(22) Filed: May 5, 1999

(51) Int. Cl.[7] .......................... C03B 29/00; B32B 31/00; B44C 1/165
(52) U.S. Cl. ..................... 156/89.11; 156/89.24; 156/230; 156/240; 156/250
(58) Field of Search ............... 428/68, 131, 137, 428/138, 141, 143, 156, 172, 187, 206, 207, 210, 542.2, 40.4; 156/89.11, 89.24, 230, 240, 250, 252, 277; 264/652, 655, 678

(56) References Cited

U.S. PATENT DOCUMENTS

| | | | |
|---|---|---|---|
| 3,994,727 | * 11/1976 | Polichette et al. | 428/210 |
| 5,196,248 | * 3/1993 | Danico et al. | 428/46 |
| 5,362,575 | * 11/1994 | Trimble | 428/210 |
| 5,840,418 | * 11/1998 | Makita | 428/210 |

* cited by examiner

Primary Examiner—Donald J. Loney
(74) Attorney, Agent, or Firm—Bacon & Thomas

(57) ABSTRACT

A method of producing ceramic articles with a relief image comprises the steps of providing a ceramic article formed with a relief image thereon, providing a planar transfer decal having an image corresponding to the relief image, perforating the transfer decal to form a plurality of perforations through the transfer decal, applying the perforated transfer decal to the ceramic article, and firing the ceramic article with the perforated transfer article in a kiln. A pin tool comprising an array of pins is used to perforating the transfer decal. The relief image of the ceramic article can be formed in a mold or by an impressing roll such that an internal angle formed by each element of the relief image with respect to a surface of the ceramic article is less than 50 degree, preferably less than 45 degree. Pressure is applied to the perforated transfer decal against the surface of the relief image of the ceramic article manually or mechanically prior to the firing step.

8 Claims, 3 Drawing Sheets

METHOD OF PRODUCING CERAMIC ARTICLE WITH RELIEF DECORATION

BACKGROUND OF THE INVENTION

The present invention relates to a method of producing ceramic articles with relief decoration.

One of the known techniques for relief or three-dimensional decoration of ceramic articles such as porcelains, earthenware and the like involves applying a planar or two-dimensional transfer decal to a relief image on a ceramic article, and then firing the ceramic article with the transfer decal thereon in a kiln at high temperature such that the decorative ceramic inks of the transfer decal is permanently fused onto the surface of the relief image of the ceramic article. The transfer decal has desired image corresponding to the relief image on the ceramic article and typically comprises a backing paper, a water-soluble film of glue on the backing paper, a decorative ceramic ink layer printed on the glue film, and a cover coat layer on the decorative ceramic ink layer. The transfer decal is soaked in the water to separate the decorative ceramic ink layer covered by the cover coat from the backing paper before application to the ceramic article. The ceramic article with relief image on its surface may be obtained by impressing technique or molding which is of known technique.

While it is easy to obtain a transfer decal having aesthetic, colorful, printed title such as scenery, characters, and people, etc., and a ceramic article with a relief image having raised and recessed portions, it is difficult to have the transfer decal adhered to and completely conformed to the ceramic article without any cavities or blisters between the transfer decal and the raised and recessed surfaces of the relief image of the ceramic article. It is known that such cavities or blisters may cause cleavages or shrinkage in the transfer decal when firing the ceramic article. FIG. 1 shows a ceramic article 10 such as a mug having a relief design 14 covered by a transfer decal 16. It can be seen that some spaces or cavities 18 exist between the transfer decal 16 and raised and recessed sections of the relief design 14 standing out from the curved outer surface 12 of the ceramic article 10. In the prior art, it requires many laborious and costly manual operations to eliminate those spaces or cavities.

SUMMARY OF THE INVENTION

It is an object of the invention to provide an improved method for producing ceramic articles with relief decoration, ensuring that cavities or blisters that could possibill exist in between a relief image of a ceramic article and a transfer decal covered on the relief image can be significantly reduced and eliminated in a cost-effective manner.

A method of producing ceramic articles with relief decoration in accordance with the present invention comprises the steps of providing a ceramic article formed with a relief image thereon, providing a transfer decal having image corresponding to the relief image, perforating the transfer decal to form a plurality of perforations through the transfer decal, applying the perforated transfer decal to the ceramic article, and firing the ceramic article with the perforated transfer article in a kiln. A pin tool comprising an array of pins is used to perforating the transfer decal.

The relief image of the ceramic article can be formed in a mold or by an impressing roll wherein internal angle formed by each element of the relief image with respect to a surface of the ceramic article is less than 50 degree, preferably less than 45 degree, in order to facilitate conforming the perforated transfer decal to the ceramic article. The internal angle is formed at the junction where an edge of each element of the relief image and the surface of the ceramic article meet.

Upon applying the perforated transfer decal to the ceramic article, the perforations in the perforated transfer decal allow air captured therebetween to escape rapidly and thoroughly. Pressure is further applied to the perforated transfer decal against the surface of the relief image of the ceramic article manually or mechanically in order to avoid the development of cavities or blisters.

Other features and advantages of the present invention should be apparent from the following description of the preferred embodiment, which illustrates, by way of example, the principles of the invention.

DESCRIPTION OF THE PREFERRED EMBODIMENT

Figure 1:
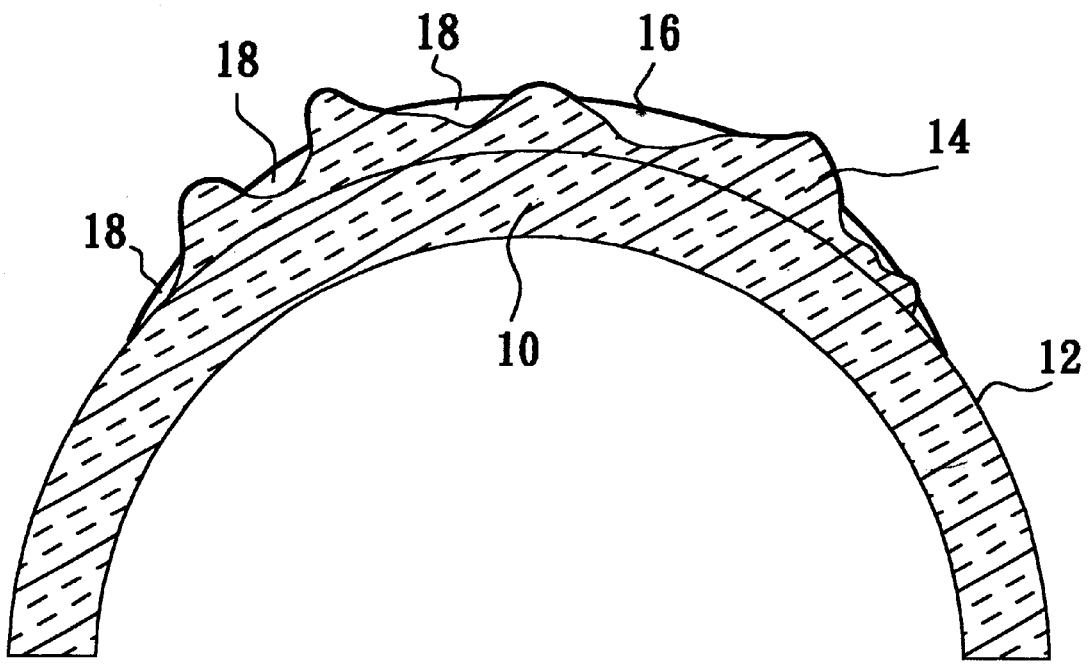
FIG. 1 is an enlarged, fragmentary cross sectional view illustrating a mug having a relief image covered by a conventional planar transfer decal.
Figure 2:
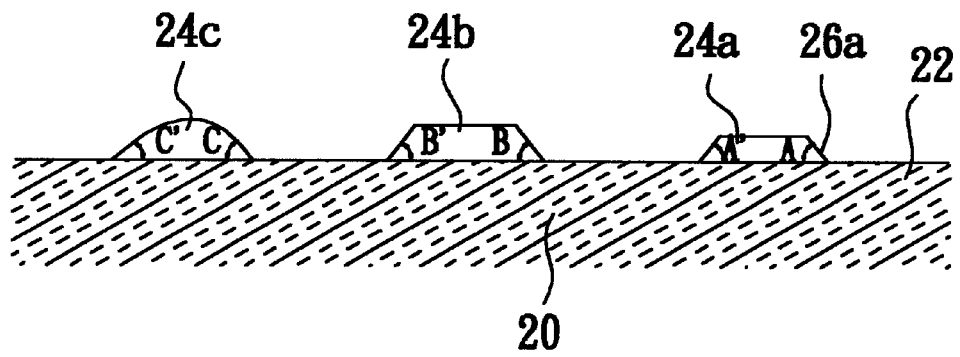
FIG. 2 is an enlarged, fragmentary cross sectional view illustrating elements of a relief image on a mug according to the present invention.

FIG. 2 illustrates a ceramic article 20 such as a mug formed with elements 24a, 24b, and 24c standing out from the surface 22 and constituting a relief image on a surface 22 of the ceramic article 20. This can be achieved by impressing technique or molding technique that is known to those skilled in the art. According to the invention, it is advantageous that elements 24a, 24b and 24c each has internal angles A, A', B, B', C and C', respectively, that is less than 50 degree, more preferably less than 45 degree. The internal angle A is formed at a junction where an edge 26a of element 24a and the surface 22 of the ceramic article 20 meet. The definition of the internal angle A applies to the remaining angles.

Figure 3:
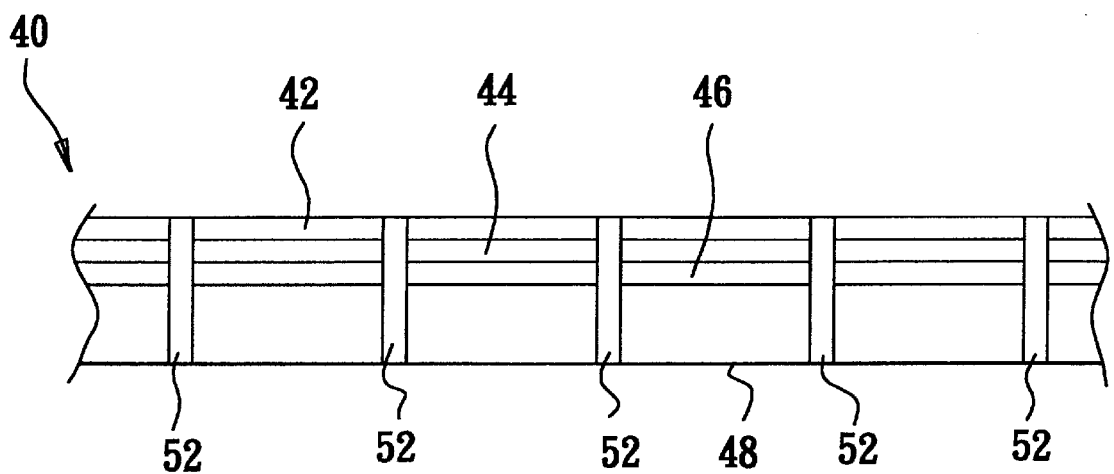
FIG. 3 is an enlarged, fragmentary cross sectional view illustrating a perforated transfer decal according to the invention.
Figure 4:
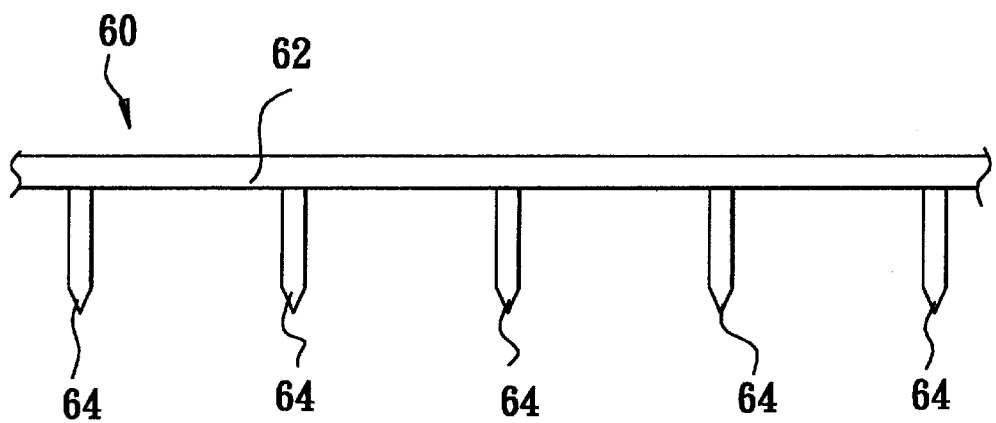
FIG. 4 is an enlarged, fragmentary cross sectional view illustrating a pin tool used for producing perforations in the transfer decal of FIG. 3.

FIG. 3 shows a transfer decal 40 according to the invention, which comprises conventional components including a backing paper 48, a water-soluble glue film 46 formed on backing paper 48 and accepting a decorative ceramic ink layer 44 thereon, and a cover coat on the decorative ceramic ink layer 44. The ceramic ink layer 44 contains an image corresponding to the relief image of the ceramic article 20. According to the invention, it is advantageous that higher flexibility of the cover coat is helpful to conform the transfer decal 40 to the ceramic article 20. This would be helpful to avoid breaking the transfer decal 40 as well as developing cavities or blisters between the transfer decal 40 and the ceramic article 20 during the application of the transfer decal 40 to the ceramic article 20. According to the invention, the transfer decal 40 is further formed with a plurality of perforations 52 therethrough. A pin tool 60 shown in FIG. 4 and comprising a planar base 62 and an array of pins 64 mounted on a side of the base 62 is used to obtain the perforations 52 in the transfer decal 40. This can be achieved by pressing the pin tool against transfer decal 40 such that the array of pins 64 penetrates the transfer decal 40. Each of the pins 64 has same diameter of from about 0.1 to 0.2 mm and the array of the pins 64 has about 20 pins per square cm.

To apply the perforated transfer decal 40 to the ceramic article 20, the perforated transfer decal 40 is wetted to dissolve the glue film 46 with the result that the backing paper 48 is removed and the transfer decal 40 is adhered to the ceramic article 20. The perforated transfer decal is kept in register with the relief image of the ceramic article 20 manually. Now, air in any cavity or blister formed between the transfer decal 40 and the relief image upon adhering the transfer decal 40 to the surface of the relief image of the ceramic article 20 can be driven out through nearby perforations 52 in the transfer decal 40 by manually pressing the perforated transfer decal 40 against the surface of the ceramic article 20.

Figure 5:
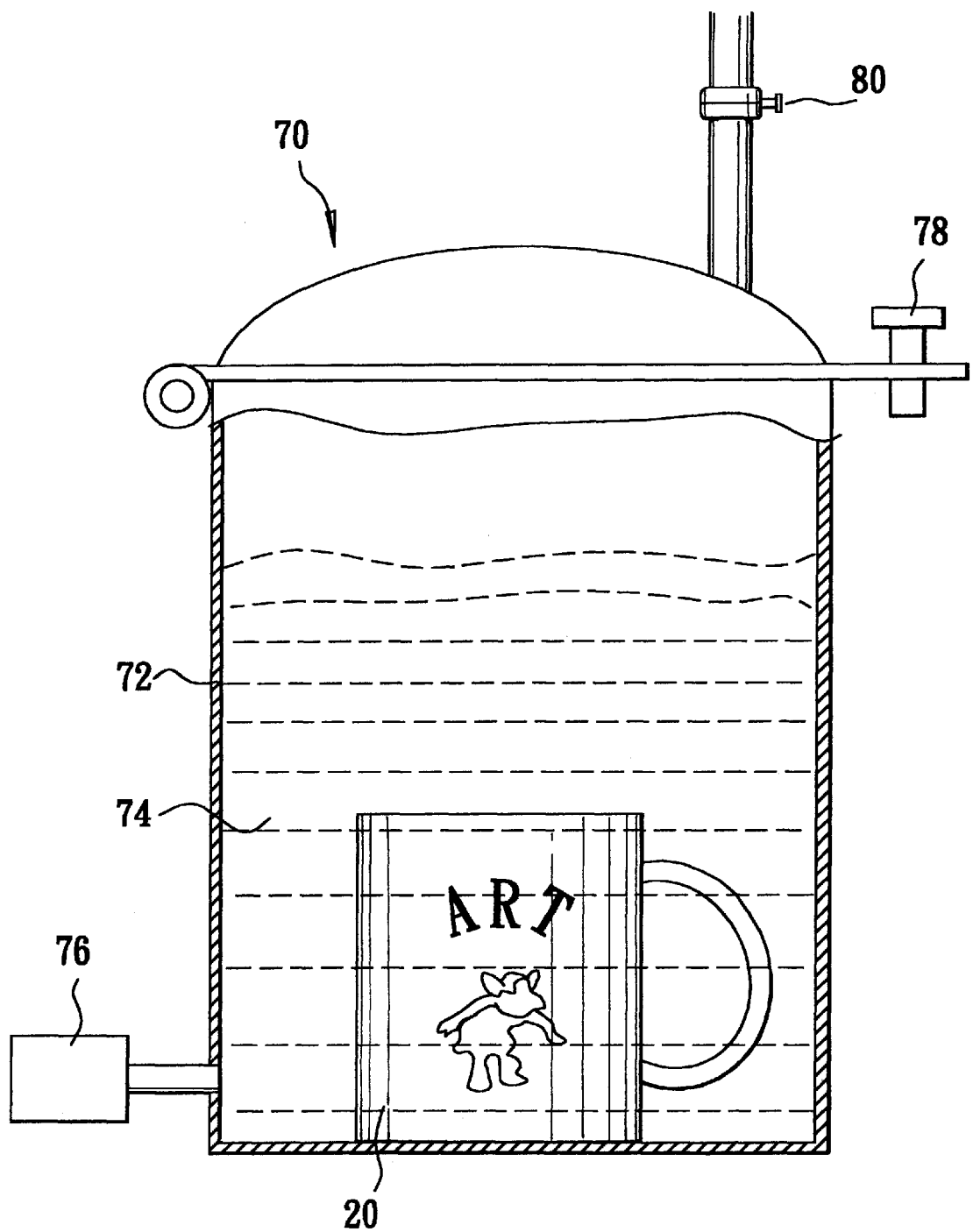
FIG. 5 is a schematic view illustrating a pressure applicator for applying uniform pressure on the perforated transfer decal against the mug surface according to the invention.

Alternatively, the application of pressure may be carried out by putting the ceramic article 20 with the perforated transfer decal 40 in a pressurized liquid tank according to the invention. FIG. 5 shows a pressure applicator 70 for this purpose. The pressure applicator 70 comprises a tank 72 containing low viscosity liquid 74 such as water and sealed by a cap 73 which is locked to the tank 72 by a locking knob 78. A pressure pump 76 is connected to the tank 72 for providing desired pressure level in the tank 72. A relief conduit 82 with a relief valve 80 allows the release of pressure in the tank 72. After the ceramic article 20 with the perforated transfer decal 40 adhered thereto is put into the water in the tank 72, the pressure in the tank 72 is elevated to about 4 to 5 kg per square cm. This causes the perforated transfer decal 40 to tightly conform to the relief image of the ceramic article 20. The air in any cavity or blister formed between the perforated transfer decal 40 and the relief image surface of the ceramic article 20 is easily driven out through nearby perforations 52 in the perforated transfer decal 40. Therefore, it is ensured that no cavity or blister exists between the perforated transfer decal and the surface of the relief image of the ceramic article. The thus obtained ceramic article with the perforated transfer decal may then be fired in a kiln in a well-known procedure.

While the invention has been particularly shown and described with respect to the preferred embodiment thereof, it should be understood by those skilled in the art that the foregoing and other changes in form and detail may be made therein without departing from the spirit and scope of the invention which should be limited only by the scope of the appended claims.

What is claimed is:

1. A method of producing ceramic articles with relief decoration, comprising the steps of:

providing a ceramic article formed with a relief image thereon;

providing a transfer decal having an image corresponding to the relief image of the ceramic article;

perforating the transfer decal to form a plurality of perforations through the transfer decal;

applying the perforated transfer decal to the ceramic article; and firing the ceramic article with the perforated transfer article in a kiln.

2. A method of claim 1 wherein the perforating step is performed by pressing a pin tool having an array of pins against the transfer decal.

3. A method of claim 1 wherein the relief image of the ceramic article comprises elements standing out from a surface of the ceramic article and each element forms an internal angle with respect to the surface of the ceramic article which is less than 50 degree.

4. A method of claim 1 wherein the internal angle is less than 45 degree.

5. A method of claim 1 further comprising prior to the firing step the step of applying pressure on the perforated transfer decal against the surface of the ceramic article on which the perforated transfer decal is placed.

6. A method of claim 5 wherein the step of applying pressure is performed by putting the ceramic article with the perforated transfer decal in pressurized liquid in a tank.

7. A method of claim 6 wherein the pressurized liquid in the tank is maintained at a pressure of from 4 to 5 kg per square cm.

8. A method of claim 1 wherein the transfer decal comprises a backing paper, a water-soluble glue film formed on the backing paper and accepting a decorative ceramic ink layer thereon, and a cover coat on the decorative ceramic ink layer, and wherein the cover coat is of high flexibility.

\* \* \* \* \*